United States Patent [19]

Aratsu

[11] Patent Number: 4,669,327
[45] Date of Patent: Jun. 2, 1987

[54] VIBRATION PREVENTING DEVICE IN INTERMITTENT DRIVING MECHANISM

[75] Inventor: Syuichi Aratsu, Tamayama, Japan

[73] Assignee: Alps Electric Co., Ltd., Japan

[21] Appl. No.: 899,771

[22] Filed: Aug. 22, 1986

Related U.S. Application Data

[63] Continuation of Ser. No. 659,657, Oct. 11, 1984, abandoned.

[30] Foreign Application Priority Data

Oct. 12, 1983 [JP] Japan ................... 58-190177

[51] Int. Cl.⁴ ............ F16H 55/18; F16F 15/10; F16C 3/00
[52] U.S. Cl. ............... 74/409; 346/139 R; 464/180; 74/574; 188/83
[58] Field of Search ............ 346/139 R, 49; 74/409, 74/440, 574; 188/83, 378; 464/180

[56] References Cited

U.S. PATENT DOCUMENTS

| | | | |
|---|---|---|---|
| 2,300,778 | 11/1942 | Cornwell | 74/574 |
| 2,440,901 | 5/1948 | Larson | 346/139 R |
| 4,406,174 | 9/1983 | Szostak | 74/409 |

Primary Examiner—E. A. Goldberg
Assistant Examiner—Mark Reinhart
Attorney, Agent, or Firm—Guy W. Shoup

[57] ABSTRACT

A vibration preventing device in an intermittent driving mechanism for intermittently operating a driven member having a specified mass with a motor, includes an elastic body interposed between an operating member and a stationary member facing thereto which are disposed in a motor power transmission system, and a friction surface formed between the elastic body and the operating member or between the elastic body and the stationary member, whereby at the time of starting the motor, the load on rotation of the motor is gradually increased by elastic deformation of the elastic body.

3 Claims, 4 Drawing Figures

VIBRATION PREVENTING DEVICE IN INTERMITTENT DRIVING MECHANISM this is a continuation application from application Ser. No. 659,657, filed Oct. 11, 1984, now abandoned.

BACKGROUND OF THE INVENTION

The present invention relates to an intermittent driving mechanism such as a carriage driving mechanism in a printer. More specifically, the invention relates to a vibration preventing device for preventing vibration from being produced at the time of stopping a driven member having a specified mass such as a carriage.

FIG. 1 of the accompanying drawings is a plan view of a pen printer. In this printer, recording paper (not shown) is fed out in the direction (X direction) orthogonal to the sheet of FIG. 1 by a rotatable platen 2 mounted on a base 1, and a carriage 3 is moved laterally (Y direction) as shown in FIG. 1. Then, one of plural pens P mounted on the carriage 3 is pressed by a hammer 4 to bring the tip of the pen into contact with the recording paper. Simultaneously, the pen is controlled to move in the above X and Y directions so as to record desired characters, signs or figures.

In the above printer, the power of a stepping motor Mx is transmitted through a gearing 5 to the platen 2 to rotate the platen 2. The power of a stepping motor My is also transmitted from a pinion 6 secured to a rotatable shaft m through an intermittent gear 7 to a gear 8, for thereby driving a drum 8a integral with the gear 8. By a wire 9 wrapped round the drum 8a, the carriage 3 can be driven along a guide shaft 3a. The foregoing components for transmitting the driving force to the carriage 3 constitute an intermittent driving mechanism 10.

In the intermittent driving mechanism 10 described above, the carriage 3 (a driven member having a specified mass) with the pens P mounted thereon is intermittently moved by the stepping motor My. When such movement is stopped, a driving system such as a rotor of the motor is subjected to damping vibrations due to inertia of the carriage 3 or characteristics of the stepping motor. Such damping vibrations make the recording operation of the printer unstable.

In order to cancel such vibrations, there has conventionally been provided a vibration preventing device as shown in FIG. 2. In the conventional vibration preventing device, a resistance plate 11 is pressed against a rotatable shaft m of a stepping motor My to apply a fixed frictional resistance to the rotative power of the stepping motor My, with the result that the generation of vibrations in a driving system can be prevented when the stepping motor My stops.

With the above prior vibration preventing device, however, as the fixed resistance is always applied to the rotatable shaft m by the resistance plate 11, a large load is imposed on the stepping motor My. Especially at the time of starting the stepping motor My, large power is required by the motor. This results in the disadvantage is that excessive power consumed.

SUMMARY OF THE INVENTION

The present invention has been made in view of the above problems of prior art. It is an object of the present invention to provide a vibration preventing device in an intermittent driving mechanism, which is capable of preventing vibrations caused by a motor in a driving system and of reducing a motor load to a minimum at the time of starting the motor.

According to the present invention, an elastic body is interposed between an operating member disposed in a motor power transmission system and a stationary member facing thereto, and a friction surface is formed between the elastic body and the operating member or between the elastic body and the stationary member, so that at the time of starting the motor, operation resistance is produced by elastic deformation of the elastic body, and some time after starting, both member slide at the above friction surface to produce a desired degree of operation resistance. Accordingly, vibrations produced at the time of stopping a driven member may be prevented effectively by such a desired degree of operation resistance, and no excessive load may be imposed at the time of starting the motor. Therefore, the starting voltage of the motor may not be greater than necessary so as to economize in power consumption. Further, since excessive frictional forces are not imposed upon a vibration preventing mechanism, the mechanism may not be worn away, thereby improving reliability of the apparatus.

Preferred embodiments of the present invention will be described with reference to the accompany drawings.

DETAILED DESCRIPTION OF THE PREFERRED EMBODIMENTS

Figure 3:
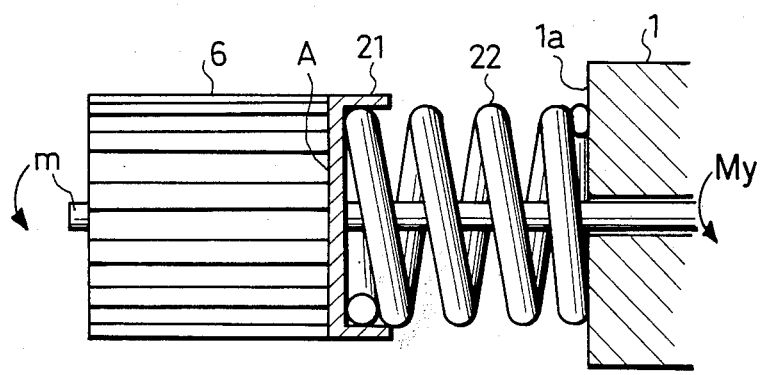
FIG. 3 is an enlarged cross-sectional view showing a first embodiment of a vibration preventing device in the intermittent driving mechanism according to the present invention.
Figure 4:
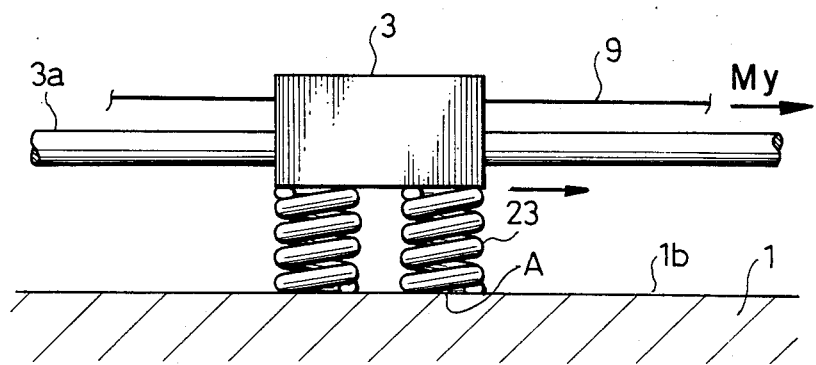
FIG. 4 is a side elevational view, at an enlarged scale, showing a second embodiment of the present invention.

FIG. 3 is a side elevational view showing a first embodiment of a vibration preventing device, and FIG. 4 is a side elevational view showing a second embodiment of a vibration preventing device. Each of the devices shown in FIGS. 3 and 4 is mounted in the driving system comprising the intermittent driving mechanism 10 of the pen printer shown in FIG. 1.

Figure 1:
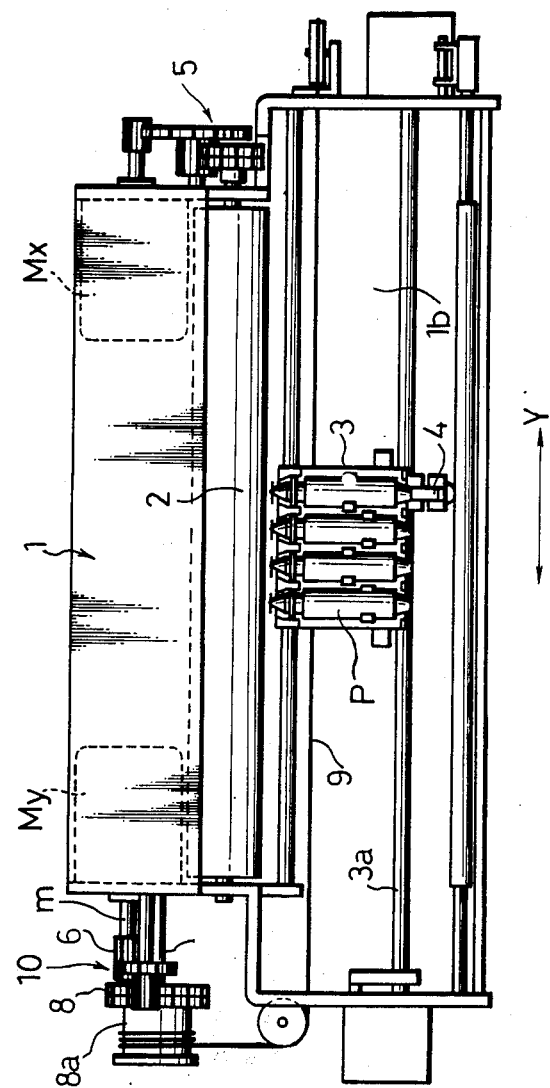
FIG. 1 is a plan view of a pen printer.
Figure 2:
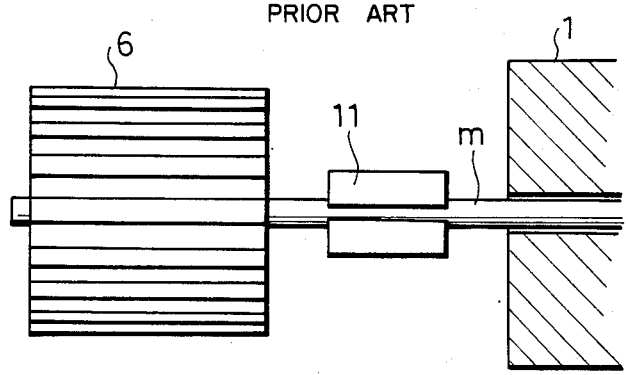
FIG. 2 is a side elevational view illustrating a conventional vibration preventing device adopted in an intermittent driving mechanism of the printer.

FIG. 3 illustrates the vibration preventing device, wherein a vibration preventing function is provided at the power output portion of a stepping motor My. The reference character m in FIG. 3 designates a rotatable shaft of the stepping motor My, and the numeral 6 a pinion. As shown in FIG. 1, the pinion 6 is in mesh with an intermittent gear 7 to drive a wire 9 through a drum 8a. A friction plate 21 and a coil spring 22 is disposed as a mechanism for preventing vibration. The friction plate 21 is of a cap-shape and held against the end surface of the pinion 6, with a friction surface A formed between both sliding contact surfaces thereof. A coil spring 22 is interposed between the friction plate 21 and a stationary surface 1a of a side of the base 1.

Operation of the vibration preventing device of the first embodiment will be described.

When the stepping motor My starts to rotate the pinion 6, the friction plate 21 is rotated therewith by the frictional resistance from the friction surface A, and the coil spring 22 is twisted or distorted. At the time of starting, the load of the stepping motor My is gradually increased from the minimum by elastic deformation of the coil spring 22. When the pinion 6 is rotated through a certain angle, the torsion of the spring 22 reaches a limit. Thereafter, the pinion 6 and the friction plate 21 slide with respect to each other at the friction surface A. When they start to slide at the friction surface A, since the coefficient of dynamical friction is small, the torsion of the spring 22 is removed, so that the coil spring 22 and the friction plate 21 return to their initial positions. When the stepping motor My stops in the middle of print operation performed by the pens P (FIG. 1) on the carriage 3, the pinion 6 tends to vibrate by inertia in the power transmission system including the carriage 3 according to the characteristics of the stepping motor. Upon stoppage of the stepping motor, however, the friction plate 21 and the spring 22 give resistance to the pinion to restrain such vibrations. That is, this vibration preventing device is arranged such that at the time of starting the stepping motor My, the operation resistance is minimum and when the pinion 6 is rotated at a constant speed, the operation resistance is large.

FIG. 4 illustrates the vibration preventing device according to a second embodiment, wherein a vibration preventing function is provided at the operating portion of a carriage 3 with pens P mounted thereon.

In FIG. 4, the reference numeral 3 indicates a carriage, on which a plurality of pens P are arranged thereon. The carriage 3 is supported on a guide shaft 3a so as to move in the right and left directions as shown in FIG. 4. An upper surface 1b of the base 1 serves as a stationary surface facing the carriage 3. The stationary surface 1b is positioned further back from the paper surface than the carriage 3. A plurality of coil springs 23 are fixed to the lower surface of the carriage 3, and each lower end of the coil springs is in contact with the stationary surface 1b through a friction surface A.

Operation of the second embodiment of the vibration preventing device will be described.

When the stepping motor My (FIG. 1) is started, the carriage 3 is pulled by a wire 9 to start moving in the right and left directions in FIG. 4. At the time the motor is started, the coil springs 23 are buckled at first. As such buckling is elastic deformation, resistance to operation of the stepping motor driving system is small when the motor is started. Some time after the carriage 3 has started to move, the buckling of the spring reaches a limit, and then the springs 23 and the stationary surface 1a slide at the friction surface A. When the carriage 3 stops, the springs 23 give resistance thereto not to produce vibrations due to inertia.

In the described embodiments, other elastic substances such as a leaf spring, rubber and so on may be used in place of the coil springs.

What is claimed is:

1. A vibration reducing device for applying a predetermined resistance to a driving mechanism which transmits power from an intermittently operated motor to a driven mass through an operating member, the vibration reducing device being interposed between a moving point of said operating member of the driving mechanism and a stationary point, comprising:

frictional sliding means frictionally coupled to a first of said two points for frictionally and slidingly applying a predetermined resistance to said operating member; and an elastic body coupled between the frictional sliding means and the second point which is elastically deformed by the driving force initially transmitted from the motor to said operating member for elastically transmitting power between the two points such that initial operation resistance is produced by elastic deformation of said elastic body and the resistance applied to the moving point gradually increases as a limit of elastic deformation of the elastic body is reached and frictional sliding means applies the predetermined resistance to said operating member.

2. A vibration reducing device according to claim 1 wherein said frictional means is a friction plate held in frictional contact with said moving point and said elastic means is a coil spring.

3. A vibration reducing device according to claim 1 wherein the frictional force between the frictional means and the first point is substantially greater than the elastic force of the elastic means when the latter is unloaded such that the friction means will not slide when the elastic means is first loaded during the start of said motor.

* * * * *